Nov. 3, 1953            J. D. RUST            2,657,515

ROTARY COTTON FLUFFER

Filed Feb. 27, 1952            3 Sheets-Sheet 1

INVENTOR.
JOHN D. RUST
BY
Estabrook & Estabrook
ATTORNEYS

Nov. 3, 1953         J. D. RUST         2,657,515
ROTARY COTTON FLUFFER
Filed Feb. 27, 1952         3 Sheets-Sheet 2
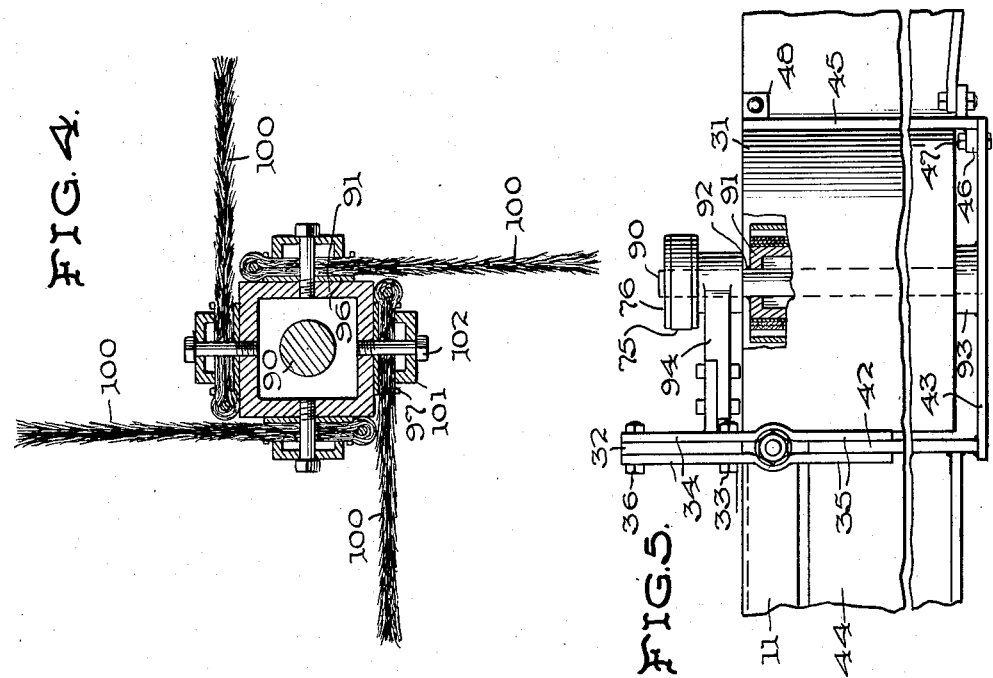
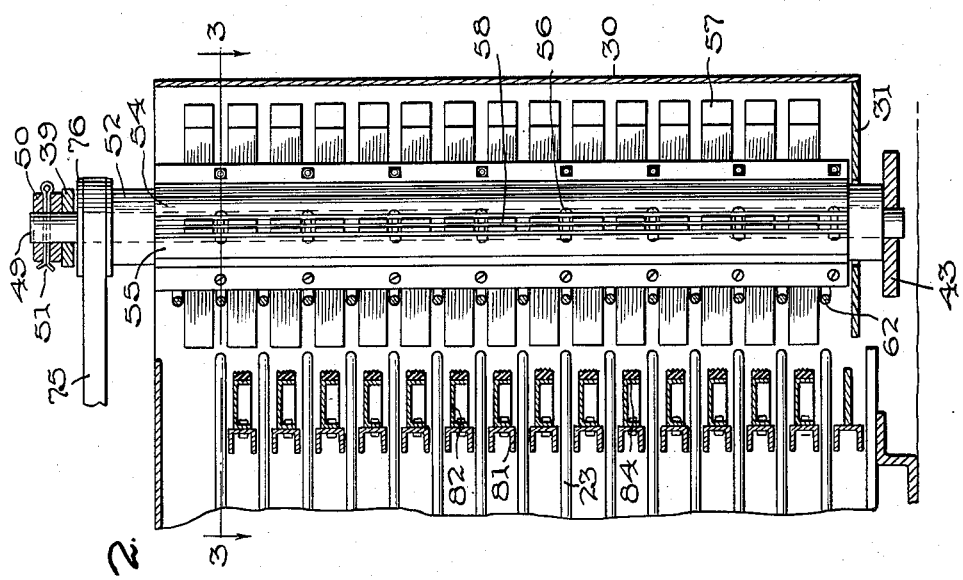
INVENTOR.
JOHN D. RUST
BY Estabrook & Estabrook
ATTORNEYS Nov. 3, 1953

J. D. RUST 2,657,515

ROTARY COTTON FLUFFER

Filed Feb. 27, 1952

INVENTOR.
JOHN D. RUST

BY Estabrook & Estabrook

ATTORNEYS

Patented Nov. 3, 1953

2,657,515

UNITED STATES PATENT OFFICE 2,657,515

ROTARY COTTON FLUFFER

John D. Rust, Pine Bluff, Ark.

Application February 27, 1952, Serial No. 273,584

6 Claims. (Cl. 56—42)

The present invention relates broadly to cotton picking machines, and more particularly to an improvement for such machines for fluffing the lint of open cotton bolls.

The present application is an improvement over my copending application Serial No. 219,145, filed April 4, 1951.

It has been found from experience that healthy and mature cotton can be very effectively and efficiently picked by spindle type machines when the lint of the open cotton boll is in a fluffy state or condition. Under such conditions the moistened wire spindles of a cotton picking machine, such as shown in Rust Patent No. 2,085,046, readily engage the lint of the open cotton boll and wind the cotton upon the spindles, thus thoroughly picking the open cotton from the stalk.

Such a condition, however, does not always exist in a field of open cotton due to boll weevil infestation. "honeydew," or other adverse conditions. Under such circumstances a large percentage of the open cotton is not fluffy, and consequently it does not readily wind onto the spindles. The present invention is designed to overcome such conditions by fluffing the lint of the open cotton bolls.

In certain of my previous designs I have employed either a stationary or a rotary type cotton fluffing device. The stationary type of cotton fluffing device has proven to be quite effective in its use, however, it is designed primarily for use in fields where practically all of the cotton bolls are open. The rotary type of cotton fluffing device, that I have employed heretofore, is readily adaptable for use in cotton fields wherein the cotton stalks or plants have both green and open cotton bolls and this fluffing device is so designed that it will not damage the green bolls or the plants, yet will so engage the open cotton bolls as to fluff the lint of the open cotton.

It has been found from experience that the rotary type of cotton fluffing device employed heretofore has proven to be quite effective when used in fields of cotton that are relatively free from weeds, vines, grasses and the like. However, in fields of cotton wherein the growth of vines, grasses and the like is heavy and thick, and, in close proximity to the cotton plants, the rotary type cotton fluffing device of my prior design has not been capable of continuous operation due to portions of the grasses, vines and the like becoming entwined with locks of cotton within the housing enclosing the rotary cotton fluffer. The entwined grasses, vines and the like along with the cotton become entrapped within the housing due to the cotton plant guide fingers extending across the forward open end of the housing and thus restricting the discharge area of the housing. Thus the entrapped grasses, vines and the like along with the cotton would become twisted or entwined into a long stringy rope like mass gradually increasing in size within the housing and finally preventing the cotton fluffer from rotating within the housing. Such a condition necessitated frequent stopping of the cotton picking machine in order to remove the rope like mass of cotton and weeds from the housing.

The rotary type cotton fluffing device of the present invention is designed for use in any type of cotton field whether there is a heavy growth of grasses, vines and the like or wherein the growth of said vines and the like are absent or extremely sparse. The fluffing device of the present invention is so designed that it may be included in a picking unit as an integral part thereof at the time of constructing said picking unit, or it is readily adaptable for use as an attachment for picking units that have already been constructed, in that the fluffing device is so designed that it may be detachably mounted on a picking unit thereby permitting the fluffing device to be readily removed from said unit when its use is not required.

One of the objects of the present invention is to provide a cotton picking unit having a rotary member for engaging and fluffing the lint of open cotton bolls.

Another object is to provide a cotton picking unit having a rotary member disposed within a housing wherein the housing has a discharge opening therein free of obstructions thereby enabling the rotary member to freely eject any cotton that might be drawn into the housing.

A further object is to provide a cotton picking unit having a rotary cotton fluffing member with flexible flaps thereon, which flaps are adapted to yield and permit the passage of green bolls without damaging said bolls.

A further object is to provide a cotton picking unit having a rotary member disposed within a housing with a plurality of spaced guide members extending across an open side of said housing and terminating in spaced relation with one edge of the housing to define with said housing a discharge opening for the free ejection of any cotton drawn into said housing.

Further objects of the present invention are to provide a cotton picking unit having a rotatable member which is simple in design, economical of manufacture, and capable of conditioning open cotton bolls for effectively picking the cotton as it enters the picking tunnel or plant passageway of the cotton picking unit.

Other objects or advantages more or less ancillary to the foregoing and the manner in which all of the various objects are realized will appear in the following description, which considered in connection with the accompanying drawings sets forth the preferred embodiment of the invention.

Referring to the drawings wherein the preferred embodiment of the invention is illustrated:

Figure 2 is an enlarged vertical sectional view showing the cotton fluffing device and its relation with the picking spindles, the view being taken on a line 2—2 of Figure 1;

Figure 4 is a sectional view of another form of rotatable cotton fluffing device;

Figure 5 is an enlarged side elevational view of the housing for the rotary cotton fluffer showing the portion of the cotton picking unit upon which the rotary cotton fluffing device is mounted.

Figure 1:
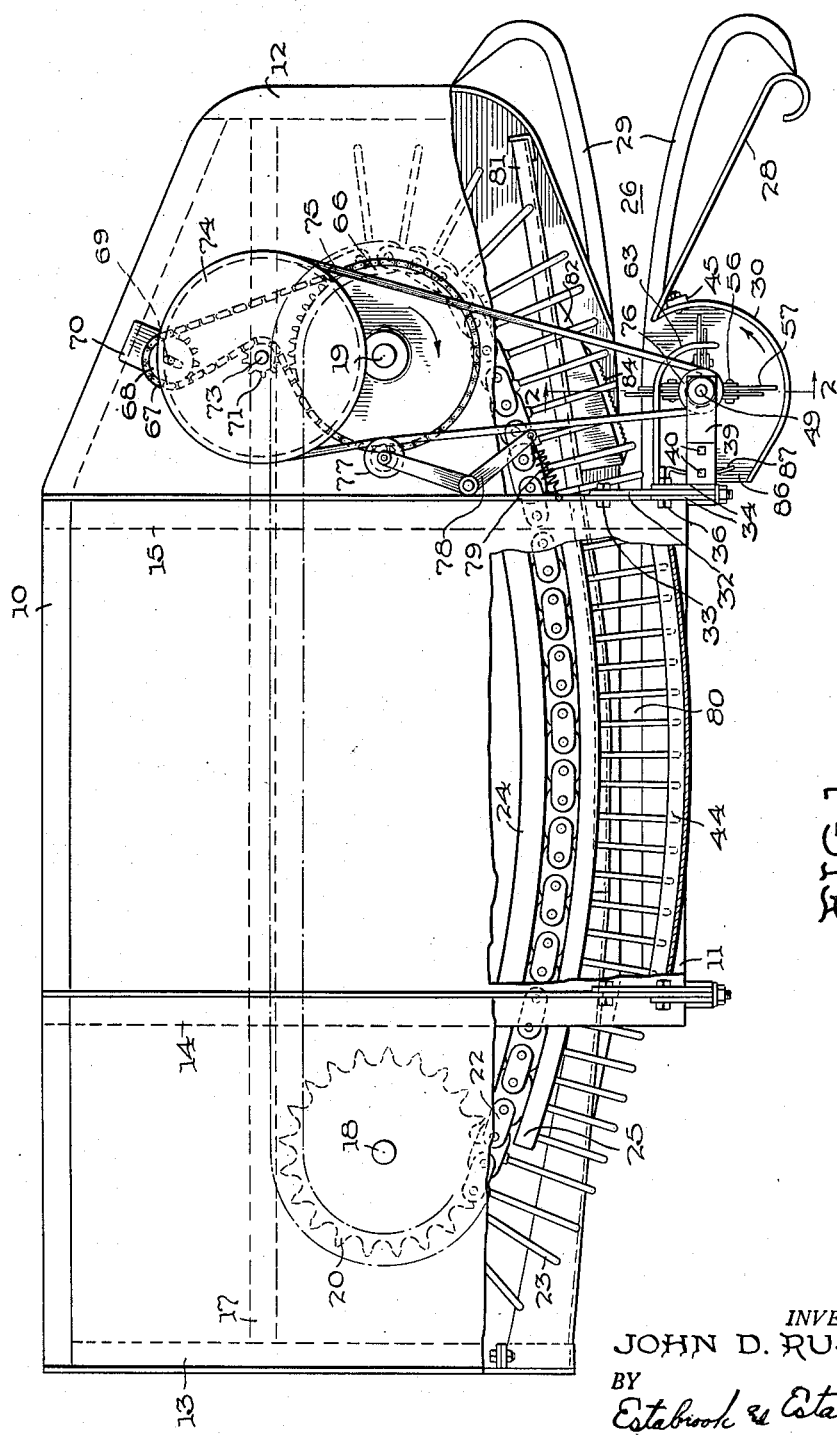
Figure 1 is a top plan view of a cotton picking unit showing the drive mechanism for the rotary fluffing device of the present invention with a portion of the housing cover removed.

Referring to the drawings, there is shown in Figure 1 a cotton picking unit having side frame members 10 and 11, and end frame members 12 and 13. The side frame members 10 and 11 have transverse frame bracing members 14 and 15 secured thereto by welding or any other suitable means. A longitudinally extending frame bracing member 17 is detachably secured to the end frame members 12 and 13 and the transverse frame members 14 and 15 to help provide a rigid frame structure for the picking unit. The picking unit carrying structure is not illustrated as it is not, per se, a part of the present invention, however, the unit may be carried in any suitable manner by means of various structures such as are shown in Rust Patents 2,085,046; 2,175,216; 2,502,063 and others.

A drive shaft 18 and a driven shaft 19 are mounted in suitable bearing supports, not shown, on the frame structure of the picking unit. The shafts 18 and 19 have suitable sprockets mounted thereon, but only the top drive sprocket 20 on the shaft 18 is indicated in dotted lines in Figure 1. The sprockets on shafts 18 and 19 have chains 22 entrained thereabout for carrying spindle slats, not shown, which in turn have spindles 23 journalled therein. It is to be understood that the shafts 18 and 19 are provided with sprockets adjacent their top and bottom ends and each of the sprockets mounted on the respective shafts have chains entrained thereabout and the spindle slats may be connected to and extend between the top and bottom chains in a manner similar to that shown in Rust Patent 2,085,046 of June 29, 1937. The transverse frame members 14 and 15 have secured thereto adjacent one side of the picking unit guide rails 24 and 25 which are conventionally employed for guiding and supporting the top chain of the spindle conveyor.

A picking tunnel or plant passageway 26 extends from the forward end of the cotton picking unit to the transverse frame member 14 so that the spindles 23 which project into the plant passageway 26 are capable of engaging the open cotton bolls as the plants pass through the plant passageway during the travel of the cotton picking machine along a row of plants. The forward end portion or entrance of the picking tunnel or passageway 26 is defined by curved elements 28, which together with boll lifting elements 29 engage and direct the cotton plants into the picking mechanism as the cotton picking machine moves along a row of plants. All of the foregoing parts and elements are conventional in a cotton picking unit such as is shown in the aforementioned patents, and per se, do not constitute a part of the present invention, thus a more detailed description of said parts or elements is not deemed necessary.

As shown in Figures 1 and 5, a housing 30 having a floor 31 for enclosing a rotary member is positioned intermediate the transverse frame member 15 and one of the guide elements 28. The transverse frame member 15 has a vertically extending plate 32 secured thereto at one end by suitable bolts 33. A pair of arms 34 are secured to opposite sides of the plate 32 and project outwardly beyond the side frame member 11 with the ends of said arms terminating in downwardly extending portions 35. The arms 34 are secured to the plate 32 by a nut and bolt 36 for pivotal movement with respect thereto. A spring, not shown, is connected to the depending portions 35 and the frame member 11 to permit a slight yielding movement of said depending portions 35 of the arms 34.

One of the arms 34 has welded thereto an outwardly projecting bracket, not shown, to which a plate member 39, Figure 1, is secured by nuts and bolts 40. The depending portions 35 of the arms 34 have a flat bar or plate 42 disposed therebetween and welded thereto. The flat bar 42 extends down and along one side of the cotton picking unit and terminates in a plate member 43, Figure 5, which is welded to said bar. A stalk crowder 44 extends along the outer side of the plant passageway 26 with the forward end of the stalk crowder being secured to the flat bar 42, Figure 3, by welding or any other suitable means. Thus the stalk crowder 44 is pivotally suspended from the transverse frame member 15 through the arms 34 and the downwardly extending portions 35. The rear end portion of the stalk crowder 44 terminates adjacent the transverse frame member 14 and is pivotally suspended from the transverse frame member 14 in the same manner that the forward end portion is suspended from the transverse frame member 15.

The plate 43 extends across and beneath the bottom 31 of the housing 30, and has secured at its forward end a vertically extending post or member 45. The lower end of the post 45 is provided with a lug 46 for securing said post to the plate member 43 by a nut and bolt 47. The upper end of the post 45 is provided with a lug 48 for anchoring said post to the top of the forward portion of the picking unit frame, not shown. As shown in Figure 2 the plate members 39 and 43 are adapted to support a shaft or rod 49, which rod projects through said suitable apertures provided in said plate members. The upper end of the rod or shaft 49 extends through a cap member 50, which is welded to the top surface of the plate member 39 and a cotter pin 51 extends across and through said cap member 50 and shaft 49 for securing said shaft or rod against rotation. A rotary member 52 is mounted for rotation on the shaft or rod 49 intermediate the plate members 39 and 43. The shaft 49 and rotary member 52 project through a suitable opening provided in the bottom 31 of the housing 30. Suitable bearings 53 are interposed between the rotary member 52 and shaft 49 so that the rotary member 52 will have a free rotative movement with respect to the shaft 49.

Figure 3:
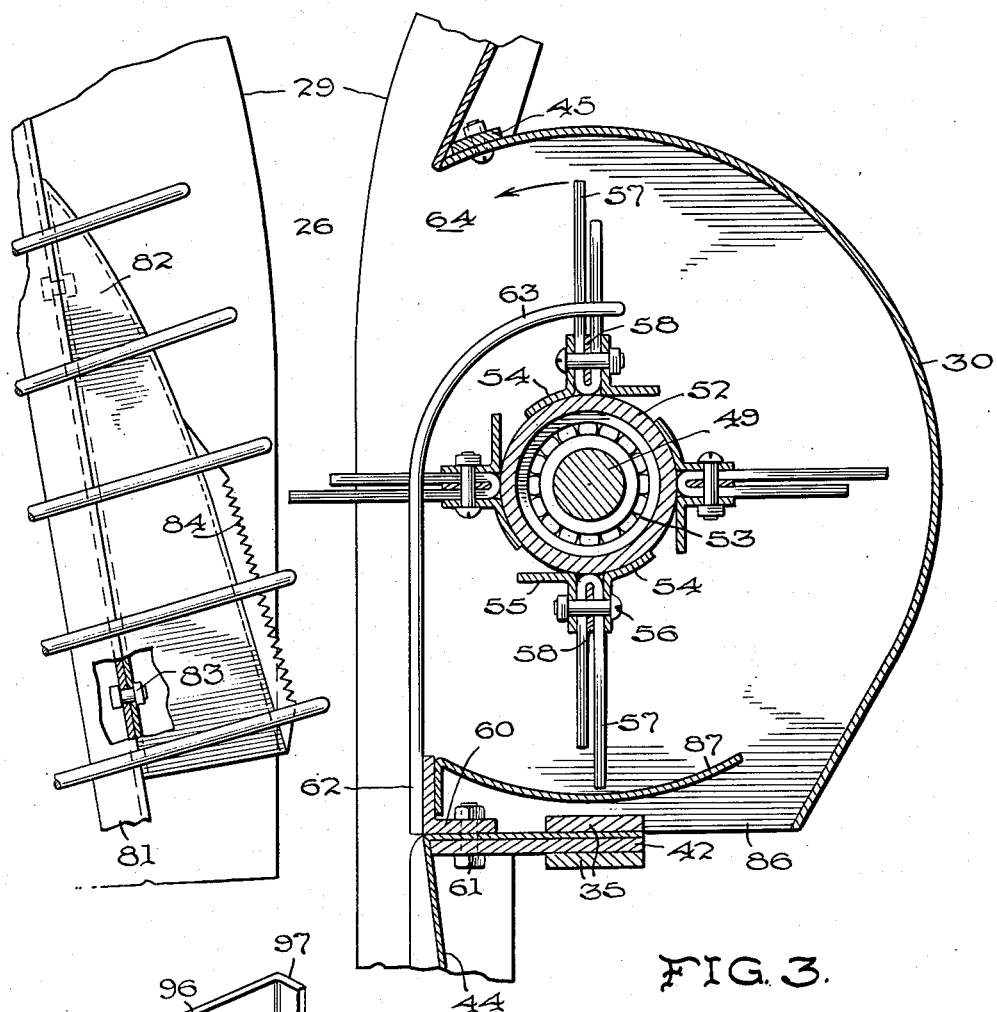
Figure 3 is a cross sectional view on an enlarged scale of the cotton fluffing device and the cotton plant guide members, the view being taken on a line 3—3 of Figure 2.

The rotary member 52 has secured thereto by welding or any other suitable means angle brackets 54. The brackets 54 are secured to the outer surface of the rotary member 52 at diametrically opposite points, and extend throughout the greater portion of the length of said rotary member. A complementary clamping member 55 is secured to each of the brackets 54 throughout the length of the brackets by suitable nuts and bolts 56. The brackets 54 and clamps 55 have mounted therebetween a plurality of vertically spaced flexible members or flaps 57. As shown in Figure 3 the flaps 57 are folded in back to back relation so that as the outer end portions of the flaps 57 become worn the individual flaps may be released from between the bracket 54 and clamp 55 and adjusted by moving one end of the flap in towards said bracket and the other end outwardly from said bracket to the proper operating position, thus compensating for the worn portion of the flap. As shown in Figures 2 and 3, a metallic stiffening plate or member 58 is inserted between adjacent pairs of flaps 57 at the inner folded portion of the flaps and said plate member 58 is retained in position by a nut and bolt 56 which projects through the bracket 54 and clamp 55 and plate member 58. The nuts and bolts 56 extend through the brackets 54, clamp 55 and plate member 58 between adjacent flaps 57. Thus to adjust or replace any one of the flaps 57 the nuts and bolts 56 are loosened so as to loosen the clamp 55 from the bracket 54 whereupon the flap may be readily adjusted or replaced. Thus the rotary member is provided throughout its length with a plurality of spaced flaps, which flaps are adapted to engage the open cotton bolls as the cotton plants pass through the plant passageway 26.

As shown in Figure 3 the inner edge portion of the flat bar 42 and the forward end of the stalk crowder 44 have secured thereto a vertically extending angular member 60. Suitable nuts and bolts 61 are employed for securing the angular member 60 to the stalk crowder 44 and flat bar 42. The angular member 60 is provided throughout its length with spaced guide fingers or members 62, which members have an end thereof secured to said angular member 60 by welding or any other suitable means. The guide fingers 62 project along one side and towards the entrance of the plant passageway 26 with the free ends 63 of the rods being curved and arranged to extend around the rotary member 52 but in spaced relation therewith. The guide fingers 62 are so spaced on the angular member 60 as to permit the guide fingers to extend between adjacent flap members 57 mounted in the brackets 54 and 55 on the rotary member 52.

The forward ends 63 of the guide fingers 62 are spaced from the forward portion of the housing 30 to provide a discharge opening 64 for said housing, which opening is free of any obstructions. Thus upon the rotation of the rotary member 52, the flaps 57, in their path of rotation, are adapted to move between adjacent guide fingers 62 and any cotton that might be drawn into the housing 30 by the flaps 57 will be freely ejected from the housing 30 through the opening 64 and delivered back into the plant passageway 26. The rotative movement of the flaps 57 will readily deliver back into the passageway 26 any loose cotton that may be drawn into the housing 30. Thus the loose cotton delivered through the opening 64 is directed into the throat of the plant passageway so that this loose cotton may be engaged by the spindles 23 as said spindles move into the throat of the plant passageway 26.

The driven shaft 19, Figure 1, has a sprocket 66 secured to the top end portion thereof with a sprocket chain 67 entrained thereabout. The chain 67 passes around an idler sprocket 68 that is rotatably mounted on a shaft 69 supported on a bracket 70, which is welded to the side frame member 10. The chain 67 also passes around a sprocket 71, which is rotatably mounted on a shaft 73, which is secured on the longitudinal frame member 17. There is also rotatably mounted on the shaft 73 a pulley 74, which has its hub rigidly secured to the hub of the sprocket 71 so that the sprocket 71 and pulley 74 rotate as a unit. A belt 75, preferably of the V-type, is entrained about the pulley 74 and also around a pulley 76 which is secured to the rotary member 52. An idler pulley 77 is rotatably mounted on an end of a bell crank lever 78 which is pivotally mounted on the transverse frame member 15. The idler pulley 77 is adapted to engage the belt 75 for retaining said belt under tension. A tension spring 79 is secured to the other end of the bell crank lever 78 and to the transverse frame member 15 for constantly urging the pulley 77 into engagement with the belt 75. Thus upon the rotation of shaft 19 and sprocket 66, in the direction of the arrow shown in Figure 1, the sprocket chain 67 passing around idler sprocket 68 will drive sprocket 71 and pulley 74. The direction of rotation of shaft 19 is counter to the direction of rotation of sprocket 71 and the pulley 74. Therefore, the belt 75 will rotate the pulley 76 and the rotary member 52 in the same direction as the pulley 74. Thus the movement of the rotary member 52 and the spindles 23 are in proper relation with respect to each other for the purpose desired.

The front and rear end frame members 12 and 13 have secured thereto in vertically spaced relation a plurality of stalk guards 81 which extend along the inner side of the plant passageway 26. The stalk guards 81 and the stalk crowder 44 define the picking section 80 of the plant passageway 26 in the cotton picking unit. The forward end portions of the stalk guards 81 opposite the housing 30 have secured thereto guide members 82. While the guide members 82 may be formed of single bar-like members having one end thereof secured to the stalk guards 81, they may also be formed from a solid plate member having a triangular or wedge shaped configuration with one edge thereof being secured to the stalk guards 81 by suitable nuts and bolts 83. The guide members 82 are arranged to project into the entrance portion of the plant passageway 26 opposite the rotary member 52 and the portion of the guide members 82 which project into the plant passageway 26 have secured thereto in any suitable manner serrated rubber members 84. The guide members 82 are adapted to cooperate with the guide fingers 62 to define a narrow path for guiding the cotton plants and cotton bolls into the path of rotation of the flaps 57 of the rotary member 52. The flaps 57 and serrated rubber members 84 on the guide members 82 are adapted to engage the open cotton bolls on opposite sides to fluff the lint of the open cotton bolls.

The rear end portion of the housing 30, Figures 1 and 3, is spaced from the forward end portion of the stalk crowder 44 and flat bar 42 to provide an air inlet passage 86 so that upon rotation of the rotary member 52 air will be drawn into the housing 30. There is secured to the angular member 60, Figure 3, an arcuate shaped baffle plate 87 which is spaced from the inner surface of the housing 30 and arranged to extend over a portion of the opening 86 so that any cotton which might be drawn into the housing 30 by the flaps 57 will be directed past the opening 86 and carried around the inner surface of the housing 30. Thus any cotton which might be drawn into the housing 30 in the path of rotation of the flaps 57 will be discharged from the housing 30 through the discharge opening 64 in the forward end of the housing and directed in a rearwardly direction into the throat section of the plant passageway 26. The air drawn into the housing 30, through the opening 86, will be forced around the inner surface of the housing 30 by the flaps 57 of the rotary member 52 and the air current so developed within the housing will tend to assist the flap members 57 in ejecting the cotton so drawn into the housing 30 through the discharge opening 64 and into the throat section of the passageway 26.

There is shown in Figure 4 another form of rotary member that may be employed for fluffing the open cotton bolls in lieu of the rotary member 52 disclosed in Figure 3. The cotton fluffing device shown in Figure 4 includes a rotatable shaft 90 which has a square shaped member or tube 91 mounted thereon. The tube 91 may be secured to the shaft 90 by preferably welding the ends of the tube 91 to the shaft 90 in the manner as indicated at 92 in Figure 5. The lower end of the shaft 90 is rotatably mounted in a suitable bearing support 93 provided on the plate member 43, while the upper end portion of the shaft 90 is rotatably mounted in a suitable bearing, not shown, carried in the outer end of an arm 94. The arm 94 is carried by one of the arms 34 in the same manner as plate 39 shown in Figure 1. The upper end portion of the shaft 90 which projects through the bearing support carried in the outer end of the arm 94, has affixed thereto, a pulley 76 about which the belt 75 is entrained in the same manner as disclosed with the rotatable member shown in Figure 1. Thus the shaft 90 and tube 91 are driven in the same manner as the rotatable member 52, shown in Figures 1 and 3.

Figure 6:
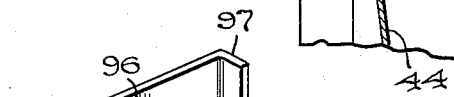
Figure 6 is an enlarged detailed view showing a mounting plate for securing the flaps on the rotatable cotton fluffing device illustrated in Figure 4.

A base or flap anchoring plate member 96, Figure 6, is secured preferably by welding to each side of the tube 91. The plate member 96 is formed with upwardly projecting side edge portions 97 which have aligned spaced cutout portions 98 formed therein. The cutout portions 98 of the plate member 96 are adapted to receive the inner ends of flexible brush like members 100. As shown in Figure 4, the flexible brush like members 100 are retained in the plate member 96 by suitable clamps 101. The clamps 101 are secured to the plate member 96 by screws 102, which screws extend through suitable apertures 103 provided in the plate member 96, Figure 6, and into the tube 91 for retaining the flexible brush like members 100 in rigid and locked engagement with the tube 91.

In the operation of the present invention the member 52 is rotated simultaneously with the rotation of the cotton picking mechanism. Thus, as the cotton picking unit is moved along a row of cotton plants the plants are directed into the plant passageway 26 by members 28 and 29. As the cotton plants enter the plant passageway the guide members 82 and guide fingers 62 engage the plants and guide them into the path of rotation of the flaps 57 which flaps strike the open cotton bolls and thus fluff the lint so that it is in the best condition for being engaged and wrapped around the rotating spindles 23. The open cotton bolls which are disposed on the inner side of the plant passageway 26 and thus might not be engaged by the flaps 57 as the plants pass between the guide fingers 62 and guide members 82 will be engaged by the serrated rubber members 84 carried by the guide members 82. Thus the serrated rubber members 84 will tend to fluff the lint of the open cotton bolls disposed on the inner side of the plant passageway. Prior to the engagement of the cotton plants by the guide fingers 62 and guide members 82, the outer end portions of the picking spindles 23 and the outer edge of the flaps 57 will engage the cotton plants and urge the plants through the narrow throat or path of the plant passageway defined by the guide members 82 and guide fingers 62, and thus tend to maintain the plants in a desirable picking position. Thus the picking efficiency of the cotton picking machine is considerably increased. In the event that some of the cotton plants still have green bolls thereon the flaps 57 will not damage the green bolls or break them off from the plant as the flexible flaps 57 will yield and ride over the green bolls without damaging same.

The cotton fluffing device shown in Figures 4 and 5 is rotatably driven in the same manner as rotary member 52 shown in Figures 1 and 3, in that the shaft 90 which has rigidly secured thereto the tube 91 is rotatable mounted in the bearing 93 on the plate 43 and a suitable bearing carried in the outer end of arm 94. Thus upon the rotation of shaft 90 and tube 91 the flexible brush like members 100 will be moved through a path of rotation for engaging the open cotton bolls as the cotton plants move through the plant passageway 26 in a manner similar to the flaps 57.

While I have shown this cotton fluffing device in connection with a picking unit of a cotton picking machine such as shown in Rust Patent 2,085,046, it is not the intention that the present device be limited to such a machine as it may be readily adapted to any spindle type cotton picking machine.

From the foregoing description, taken in connection with the accompanying drawings, it is thought that the construction, operation and advantages of the invention will be clear to those skilled in the art to which it relates.

I claim:

1. A cotton picking unit having a front and a rear end with a plurality of picking spindles intermediate said ends for engaging cotton plants, in combination with a rotatable fluffing device adapted for use in said unit and arranged to be detachably mounted in said unit, said fluffing device including a rotatable member, a plurality of flexible members secured to and projecting from said rotatable member, a plurality of spaced guide fingers mounted on said unit adjacent said rotatable member and arranged to project therefrom towards the front end of said unit, the free ends of said guide fingers being curved and arranged to extend partially around said rotatable member in spaced relation therefrom, said flexible members in their path of rotation moving between adjacent guide fingers and engaging the cotton plants to fluff the cotton.

2. A cotton fluffing device for use with a cotton picking unit having a passageway with an entrance and exit and picking spindles for engaging the cotton plants in said passageway, said fluffing device adapted for detachably mounting in said picking unit near the entrance of said passageway and including a rotatable member, a plurality of flexible members secured to and projecting from said rotatable member, a plurality of spaced guide fingers adapted to be carried by said unit with the free ends thereof extending at least partially across a side of said rotatable member and towards the entrance of said passageway, said flexible members in their path of rotation moving between adjacent guide fingers and into said passageway for engaging the cotton plants to fluff the cotton.

3. A cotton fluffing device for use with a cotton picking unit having a passageway with an entrance and exit and picking spindles for engaging the cotton plants in said passageway, said fluffing device adapted for detachably mounting in said picking unit near the entrance of said passageway and including a rotatable member, a housing for said rotatable members carried by said unit and having a peripheral opening, a plurality of flexible members secured to and projecting from said rotatable member, a plurality of spaced guide fingers adapted to be carried by said unit and arranged to extend partially across the peripheral opening of said housing towards the entrance of said passageway, the free ends of said guide fingers being curved and arranged to extend partially around said rotatable member in spaced relation therefrom and into said housing, said flexible members in their path of rotation moving between adjacent guide fingers and through said peripheral opening into said passageway for engaging the cotton plants to fluff the cotton.

4. A cotton fluffing device for use with a cotton picking unit having a passageway with an entrance and exit and picking spindles for engaging the cotton plants in said passageway, said fluffing device adapted for detachably mounting in said picking unit near the entrance of said passageway and including a housing having a peripheral opening therein, a rotatable member within said housing, a plurality of flexible brush like members secured to said rotatable member in spaced relation with one another and arranged to project through said peripheral opening, a plurality of spaced guide fingers adapted to be mounted on said unit adjacent said housing with the free ends thereof arranged to extend partially across said peripheral opening towards the entrance of said passageway, the free ends of said guide fingers being curved and arranged to extend partially around said rotatable member in spaced relation therefrom and into said housing, said flexible brush like members in their path of rotation moving between adjacent guide fingers and into said passageway for engaging the cotton plants to fluff the cotton.

5. A cotton picking unit having a passageway with an entrance and exit and picking spindles for engaging cotton plants in the passageway, a stalk crowder carried by said unit and defining a portion of said passageway, in combination with a rotatable fluffing device adapted for use in said unit and arranged to be detachably mounted on said stalk crowder adjacent the entrance of said passageway, said device including a rotatable member, a plurality of flexible members secured to and projecting from said rotatable member, a housing for said rotatable member carried by said unit, a plurality of spaced guide fingers adapted to be carried by said stalk crowder with the free ends thereof arranged to project towards the entrance of said passageway, the free ends of said guide fingers being curved and arranged to extend partially around said rotatable member in spaced relation therefrom and into said housing, said flexible members in their path of rotation moving between adjacent guide fingers and into said passageway, said guide fingers guiding the cotton plants into the path of rotation of said flexible members for fluffing the cotton, the free ends of said guide fingers being spaced from said housing and defining therewith a discharge opening in free communication with said passageway for the ejection into said passageway by said flexible members of any cotton which might be drawn into said housing upon the rotation of said flexible members.

6. A cotton picking unit having a passageway with an entrance and exit and picking spindles for engaging cotton plants in the pasageway, in combination with a rotatable fluffing device adapted for use in said unit and arranged to be detachably mounted in said unit near the entrance of said passageway, said device including a rotatable member, a plurality of flexible members secured to and projecting from said rotatable member, a housing for said rotatable member carried by said unit, a plurality of spaced guide fingers mounted on said unit adjacent said rotatable member with the free ends thereof arranged to project towards the entrance of said passageway, the free ends of said guide fingers being curved and arranged to extend around a portion of said rotatable member in spaced relation therewith, a plurality of spaced guide members carried by said unit near the entrance of said passageway and positioned opposite from said rotatable member, serrated rubber members secured to said guide members and arranged to project into said passageway, said flexible members in their path of rotation moving between adjacent guide fingers and into said passageway, said guide fingers and guide members adapted to guide the cotton plants in said passageway, said flexible members and serrated members engaging the cotton plants from opposite sides for fluffing the cotton as the cotton plants move through said passageway.

JOHN D. RUST.

References Cited in the file of this patent

UNITED STATES PATENTS

| Number | Name | Date |
|---|---|---|
| 2,058,514 | Rust et al. | Oct. 27, 1936 |